Sept. 5, 1950     H. H. RICHMOND     2,521,096
RECOVERY OF SULFOMETHAZINE AND SULFAGUANIDINE
Filed July 15, 1948
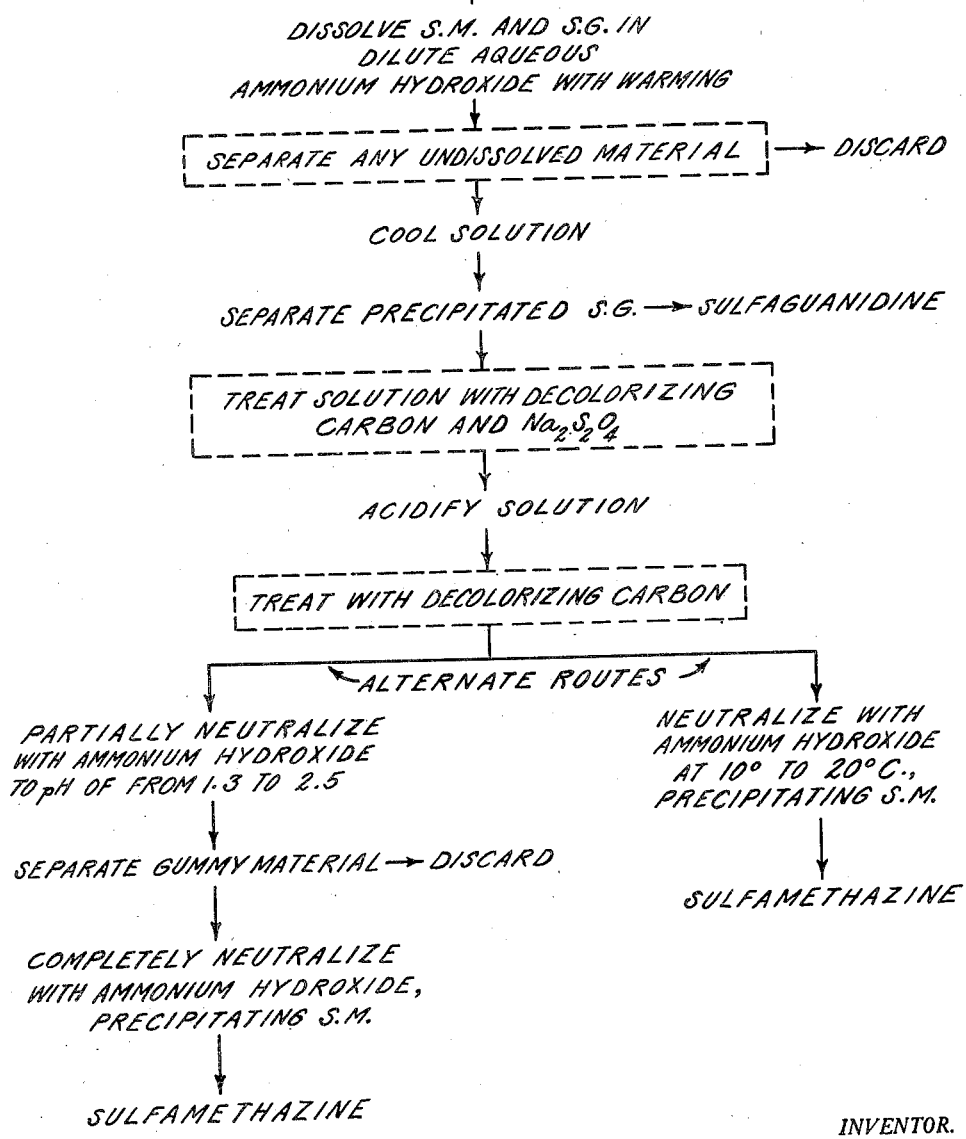
INVENTOR.
HENRY H. RICHMOND
BY
Robert J. Patterson
ATTORNEY Patented Sept. 5, 1950

2,521,096

UNITED STATES PATENT OFFICE 2,521,096

RECOVERY OF SULFAMETHAZINE AND SULFAGUANIDINE

Henry H. Richmond, Guelph, Ontario, Canada, assignor to United States Rubber Company, New York, N. Y., a corporation of New Jersey Application July 15, 1948, Serial No. 38,841

8 Claims. (Cl. 260—239.75)

This invention relates to novel improvements in the manufacture of sulfamethazine and particularly to a simple, inexpensive and efficient method of recovering unreacted sulfaguanidine from the reaction products of the condensation of sulfaguanidine and acetylacetone to form sulfamethazine. Such a reaction mixture comprises sulfamethazine formed in the reaction, unreacted sulfaguanidine and impurities of unknown nature. In addition to providing a method of recovering the unreacted sulfaguanidine in substantially pure form from such an impure mixture, my invention also provides a convenient and inexpensive method of recovering sulfamethazine in pure form from the mixture.

It has been proposed heretofore to prepare sulfamethazine by the condensation of sulfaguanidine with acetylacetone. This method offers many advantages over alternate processes of preparing sulfamethazine such as the condensation of acetylsulfanilyl chloride with 2-amino-4,6-dimethylpyrimidine. However, preparation of sulfamethazine by the condensation of sulfaguanidine with acetylacetone has presented the serious disadvantage that the reaction mixture contains considerable unreacted sulfaguanidine and there has heretofore been no simple commercially feasible method of recovering this unreacted sulfaguanidine. Since sulfaguanidine is an expensive material, this has been a serious drawback to commercial synthesis of sulfamethazine by this route. My invention provides a highly satisfactory method of recovering this unreacted sulfaguanidine and thus effects considerable economies in the synthesis of sulfamethazine by the reaction of sulfaguanidine with acetylacetone.

The accompanying drawing, which will be self-explanatory when considered with the following description, portrays diagrammatically the proccess of my invention. Optional steps are enclosed in dotted lines.

I have discovered that unreacted sulfaguanidine may be recovered from a mixture of sulfaguanidine, sulfamethazine and impurities which is obtained by the condensation of sulfaguanidine with acetylacetone to form sulfamethazine in a highly efficacious manner by dissolving the mixture of sulfaguanidine, sulfamethazine and impurities, conveniently in the form of the reaction mixture obtained directly by the condensation, in dilute aqueous ammonium hydroxide solution with warming, cooling the resulting solution and thereby effecting precipitation of the sulfaguanidine, and separating the precipitated sulfaguanidine. My invention is based on the discovery that by proceeding in this manner a major proportion or substantially all of the unreacted sulfaguanidine can be recovered in a form which is substantially uncontaminated by sulfamethazine. My method is typically carried out by adding a cold dilute aqueous solution of ammonium hydroxide to the reaction mixture, warming the mixture to effect solution of all or substantially all of the sulfaguanidine and sulfamethazine, and cooling to effect crystallization of the sulfaguanidine. The sulfaguanidine is filtered off and may be re-used for the preparation of sulfamethazine or for any other useful purpose.

When the foregoing procedure is employed substantially all of the sulfaguanidine present in the mixture is recovered. The amount of sulfaguanidine recovered will depend primarily upon the amount contained in the reaction mixture and may be as much as 20–30% of the original quantity used.

I have found that the use of ammonium hydroxide offers the advantage over the use of sodium hydroxide or the like that upon warming sulfaguanidine with sodium hydroxide the sulfaguanidine is decomposed with the evolution of ammonia. Decomposition is particularly rapid at temperatures above 80° C. However, this is avoided by the present invention since warming with ammonium hydroxide does not have a destructive effect on the sulfaguanidine. Better yields are thus obtained using ammonium hydroxide and furthermore the productivity of the process is increased since the mixture can be warmed up more rapidly and to a higher temperature.

The concentration of the dilute aqueous ammonium hydroxide solution used may vary widely. Usually the concentration will not exceed 10% by weight of ammonium hydroxide. Generally the strength will be within the range of from 1 to 5%.

The amount of the aqueous ammonium hydroxide solution employed may vary widely provided it is sufficient to dissolve all of the sulfaguanidine and sulfamethazine when the mixture is warmed to a suitable temperature. The temperature to which the mixture is warmed conveniently is within the range of from 50° to 90° C.

I prefer to effect the solution of the sulfaguanidine and the sulfamethazine in the dilute aqueous ammonium hydroxide solution by warming to a temperature of from 50° to 75° C. and to cool the resulting solution to a temperature of not over 20° C. and preferably to a temperature of from 10° to 20° C. in order to effect precipitation of the sulfaguanidine.

When the mixture of sulfaguanidine, sulfamethazine and impurities is warmed with the aqueous ammonium hydroxide solution, there may be impurities which do not go into solution. I find it desirable to remove such impurities by filtering off the solution therefrom so that upon cooling the sulfaguanidine which precipitates is not contaminated with such impurities. If a still purer grade of sulfaguanidine is desired the sulfaguanidine that crystallizes out upon cooling may be recrystallized from water.

The step of warming the reaction mixture with ammonium hydroxide to effect substantially complete solution is advantageous since in this way it is possible to remove a small quantity of impurity that is not soluble in the warm solution. Furthermore the separation of sulfaguanidine from sulfamethazine by the method of my invention is much more efficient than the mere leaching out of the sulfamethazine with cold ammonium hydroxide.

It was not to be expected that ammonium hydroxide would form a stable salt with sulfamethazine in water at an elevated temperature since ammonium hydroxide is a weak base and sulfamethazine is a weak acid; hence there was a strong probability that the salt would be hydrolyzed in water on heating. For this reason the use of ammonium hydroxide could not be predicted from the use of sodium hydroxide under the conditions used by me or under the conditions of no heating.

I have found that when sulfaguanidine is separated in accordance with my invention no sulfamethazine is precipitated therewith. This is advantageous because loss of sulfamethazine is avoided.

The sulfaguanidine is separated from the cooled mixture in any suitable manner, typically by filtration. The residual alkaline solution obtained as the filtrate may be worked up in a number of different ways to recover the sulfamethazine contained therein. I often find it desirable to treat the alkaline solution with decolorizing activated carbon, preferably in conjunction with sodium hydrosulfite, at this point in order to obtain sulfamethazine of higher quality. However this step may be omitted if desired.

The solution may then be acidified with any suitable acid, such as sulfuric acid or hydrochloric acid, past the point at which sulfamethazine precipitates to a point at which there is no undissolved material present. The acidified solution may then be treated with decolorizing activated carbon, it having been found that different impurities are absorbed by activated carbon from the acidified solution than are absorbed from the alkaline solution. In fact this treatment with decolorizing carbon is more important than the treatment of the alkaline solution with decolorizing carbon. The thus-treated solution may then be processed to recover the sulfamethazine therefrom.

The sulfamethazine is recovered from the acidified solution by neutralization with ammonium hydroxide which precipitates the sulfamethazine. For example, the required amount of ammonium hydroxide solution may be added to the acidified solution slowly with efficient stirring while maintaining the temperature at not over 20° C., and preferably at from 10° to 20° C. In this way the sulfamethazine precipitates in granular form. If the ammonium hydroxide solution is added too rapidly or if the temperature is not sufficiently low the sulfamethazine precipitates as a gummy mass which occludes impurities and is difficult to handle.

However, a preferred method of recovering the sulfamethazine from the acidified solution, from which the sulfaguanidine has been removed as described above, comprises effecting the neutralization in two steps, the solution being first neutralized to a pH of from 1.3 to 2.5, preferably to a pH of from 1.7 to 1.8, which effects precipitation of gummy impurities which can then be removed by decantation. The residual solution is then completely neutralized with ammonium hydroxide to precipitate sulfamethazine of high quality. The final neutralization accomplishes substantially complete neutralization, giving a mixture having a pH of from 6 to 7. The precipitated sulfamethazine is separated from the resulting slurry in any suitable manner, as by filtration. The method just described gives a sulfamethazine product of higher quality than that obtained by the method described in the preceding paragraph.

The following specific examples illustrate in greater detail the practice of my invention.

*Example 1*

A mixture of 20.0 g. (0.0866 mole) of sulfaguanidine and 9.5 cc. (approx. 0.0927 mole) of commercial acetylacetone was refluxed for seventeen hours, heating with an oil bath kept at 170° C. The reaction mixture was dissolved by warming to 70° C. with a solution of 20 cc. of 28% ammonia and 100 cc. of water and after filtering off the small quantity of insoluble material it was allowed to cool to 20° C. The precipitated sulfaguanidine was filtered off and washed with water, the recovery being 3.6 g. or 18%, M. P. 160° C. The filtrate was placed in a 500 cc. 3-necked flask equipped with a mechanical stirrer, a thermometer and a dropping funnel. While warming on the steam bath with stirring, 35 cc. of 37% hydrochloric acid was added obtaining a clear solution in this manner. The acid solution was then stirred with 1 g. of decolorizing carbon and filtered. The filtrate was carefully neutralized with ammonia to a pH of 1.7. The amorphous precipitate weighing 0.5 g. that came down was removed and the clear liquid remaining was neutralized to a pH of 6–7. The sulfamethazine that came down at this point was filtered off and washed with water, the yield being 16.5 g. or 84% of theory, M. P. 190° C.–195° C.

*Example 2*

To a one litre three-necked flask equipped with a stirrer, a reflux condenser and a thermometer, there was added 400 g. of sulfaguanidine hydrate (1.72 moles) and 190 cc. of commercial grade acetylacetone (approx. 1.855 moles) which was specified as containing above 90% acetylacetone. The mixture was refluxed with stirring, being heated with an oil bath kept at 140° for 19 hours. The internal liquid temperature was 97–105°. Throughout the first half of the reaction period the mixture was in solution but subsequently a solid precipitated.

The reaction mixture was steam distilled until 880 cc. of steam distillate was accumulated. The remaining suspension whose volume was about a litre and which was close to the boiling temperature was filtered through a steam jacketed Büchner and washed with 200 cc. of boiling water. The crystalline white sulfamethazine that was filtered off weighed 322 g., M. P. 196°. The filtrate on cooling deposited a yellowish drop of crystals which was a mixture of sulfamethazine and sulfaguanidine weighing 118.3 g., M. P. 140–145° C. The aqueous mother liquor whose volume was 1170 cc. was evaporated to dryness yielding a gummy solid weighing 20 g.

In order to determine the proportion of sulfaguanidine and sulfamethazine in the crude mixture obtained after the removal of the pure sulfamethazine, the crude mixture of sulfamethazine and sulfaguanidine was dissolved up with warming to 70–75° C. in a litre of an ammonia solution containing 75 cc. of 28% ammonia. On cooling a crop of 82 g. of sulfaguanidine was filtered off, M. P. 180°. The filtrate was acidified with stirring and partially neutralized with ammonia to pH 1.8 to precipitate 3 grams of syrup. The filtrate after removal of syrup was neutralized with ammonia to a pH of 6–7 to precipitate 29.8 g. of a poor quality crude sulfamethazine, M. P. 125°, which on crystallization from alcohol yielded 18 g. of sulfamethazine, M. P. 196°. Hence total tarry material weighed 14.8 g.

The steam distillate was analyzed for acetylacetone by condensation of a 10 cc. aliquot with o-phenylenediamine, (Thiele & Steimmig, Berichte 40, 455 (1907)). The weight of black precipitate was 1.72 g. indicating that there was 12.5 g. of acetylacetone in the steam distillate, a recovery of 6.8%.

The recovery of sulfaguanidine was 20% and the yield of sulfamethazine was 340 g. which is 89% based on the sulfaguanidine not recovered. The yield of sulfamethazine is 95% on the basis that the crude mixture of 118.3 g. of sulfaguanidine-sulfamethazine recovered, is considered to be sulfaguanidine.

*Example 3*

A mixture of 20.0 g. (0.094 mol) anhydrous sulfaguanidine and 9.5 cc. (approx. 0.095 mole) of commercial acetylacetone was refluxed for sixteen hours. The reaction product was dissolved in a solution of 20 cc. of concentrated (28%) ammonia in 100 cc. of water with warming to 70–75° C. and allowed to cool to room temperature. The precipitated sulfaguanidine weighing 4.3 g., M. P. 166°, was filtered off and the filtrate was slowly neutralized with cooling to a pH of 6.2 using hydrochloric acid solution. The precipitated sulfamethazine weighed 15.1 g., M. P. 190°, a yield of 74%.

*Example 4*

A mixture of 15.0 g. (0.065 mole) of sulfaguanidine and 7.1 g. of acetylacetone was refluxed for nineteen hours, heating with an oil bath kept at 170° C. The reaction mixture was dissolved in a solution of 20 cc. of 28% ammonium hydroxide solution in 100 cc. water by warming to 70–75° C. with stirring. The small quantity of insoluble material (0.2 g.) was filtered from the warm solution which was then allowed to cool. The sulfaguanidine that precipitated was filtered off and washed with water until the washings were neutral; the weight of sulfaguanidine was 3 g., M. P. 170–185° C., a recovery of 20%. The alkaline filtrate was acidified with 10% sulfuric acid solution while stirring and the resulting solution was treated with decolorizing carbon and filtered. The filtrate was then neutralized with ammonium hydroxide to a pH of 6–7 while stirring, keeping the temperature at 10–15° C. The precipitated sulfamethazine was filtered off and washed with water, the yield being 13 g. or 90% of theory, M. P. 188–190° C.

From the foregoing description it will be seen that the present invention provides a highly advantageous method of separating sulfaguanidine from sulfamethazine. The effectiveness of the separation is indicated by the fact that substantially no sulfamethazine is lost with the sulfaguanidine and substantially all of the sulfaguanidine is recovered. The process of the present invention is economical of labor and chemicals. The equipment requirements of the process are extremely simple.

It was unexpected that sulfaguanidine and sulfamethazine could be separated from the reaction mixture in the simple manner described herein for the reason that the reaction mixture is not a simple one of sulfaguanidine and sulfamethazine alone but contains in addition an unknown number of unknown impurities; hence it could not be predicted that the impurities would not have solubility characteristics similar to those of sulfaguanidine in which case upon cooling the hot ammoniacal extract of the reaction mixture such impurities would precipitate with the sulfaguanidine yielding a sulfaguanidine of very poor quality which would have to be purified by crystallization from organic solvents or other means. The sulfaguanidine recovered by the present invention is of good quality often having a melting point as high as 170° to 180° C. and is usable for the manufacture of sulfamethazine when blended with fresh sulfaguanidine. Furthermore the possibility of purifying the sulfamethazine by the partial or step-wise neutralization method described above could not have been predicted. In addition it was not to be foreseen that sulfamethazine could be obtained from the crude reaction product by the method described in a purity satisfactory for use directly for veterinary purposes without further purification as by crystallization which is required when other processes of making sulfamethazine and the other sulfa drugs are employed.

Having thus described my invention, what I claim and desire to protect by Letters Patent is:

1. A process for the recovery of unreacted sulfaguanidine substantially uncontaminated by sulfamethazine from a mixture of sulfaguanidine, sulfamethazine and impurities, which mixture is obtained by the condensation of sulfaguanidine with acetylacetone to form sulfamethazine, which comprises heating said mixture with dilute aqueous ammonium hydroxide solution with warming and thereby effecting solution of substantially all of said sulfaguanidine and sulfamethazine, cooling the resulting solution and thereby effecting precipitation of the sulfaguanidine substantially uncontaminated by sulfamethazine, and separating the precipitated sulfaguanidine from the cooled mixture.

2. A process for the recovery of unreacted sulfaguanidine substantially uncontaminated by sulfamethazine from a mixture of sulfaguanidine, sulfamethazine and impurities, which mixture is obtained by the condensation of sulfaguanidine with acetylacetone to form sufamethazine, which comprises heating said mixture with dilute aqueous ammonium hydroxide solution at a temperature of from 50° to 90° C. and thereby effecting solution of substantially all of said sulfaguanidine and sulfamethazine, separating any undissolved impurities from the resulting solution, cooling the resulting solution and thereby effecting precipitation of the sulfaguanidine substantially uncontaminated by sulfamethazine, and separating the 3. A process for the recovery of unreacted sulfaguanidine substantially uncontaminated by sulfamethazine from a mixture of sulfaguanidine, sulfamethazine and impurities, which mixture is obtained by the condensation of sulfaguanidine with acetylacetone to form sulfamethazine, which comprises heating said mixture with dilute aqueous ammonium hydroxide solution at a temperature of from 50° to 75° C. and thereby effecting solution of substantially all of said sulfaguanidine and sulfamethazine, cooling the resulting solution to a temperature of from 10° to 20° C. and thereby effecting precipitation of the sulfaguanidine substantially uncontaminated by sulfamethazine, and separating the precipitated sulfaguanidine from the cooled mixture.

4. A process for the separate recovery of unreacted sulfaguanidine substantially uncontaminated by sulfamethazine and of sulfamethazine from a mixture of sulfaguanidine, sulfamethazine and impurities, which mixture is obtained by the condensation of sulfaguanidine with acetylacetone to form sulfamethazine, which comprises heating said mixture with dilute aqueous ammonium hydroxide solution and thereby effecting solution of substantially all of said sulfaguanidine and sulfamethazine, cooling the resulting solution and thereby effecting precipitation of the sulfaguanidine substantially uncontaminated by sulfamethazine, separating the precipitated sulfaguanidine from the cooled mixture, acidifying the residual alkaline solution to a point at which there is no undissolved material present, and neutralizing the resulting solution with ammonium hydroxide to precipitate sulfamethazine.

5. A process as in claim 4 wherein the alkaline solution is treated with decolorizing activated carbon and sodium hydrosulfite prior to said acidifying step.

6. A process as in claim 4 wherein the acidified solution is treated with decolorizing activated carbon prior to said neutralizing step to precipitate sulfamethazine.

7. A process for the separate recovery of unreacted sulfaguanidine substantially uncontaminated by sulfamethazine and of sulfamethazine from a mixture of sulfaguanidine, sulfamethazine and impurities, which mixture is obtained by the condensation of sulfaguanidine with acetylacetone to form sulfamethazine, which comprises heating said mixture with dilute aqueous ammonium hydroxide solution and thereby effecting solution of substantially all of said sulfaguanidine and sulfamethazine, cooling the resulting solution and thereby effecting precipitation of the sulfaguanidine substantially uncontaminated by sulfamethazine, separating the precipitated sulfaguanidine from the cooled mixture, acidifying the residual alkaline solution to a point at which there is no undissolved material present, partially neutralizing the acidified solution with ammonium hydroxide to a pH of from 1.3 to 2.5 and thereby effecting precipitation of gummy impurities, separating said impurities, and neutralizing the residual solution with ammonium hydroxide to a pH of from 6 to 7 to precipitate sulfamethazine.

8. A process for the separate recovery of unreacted sulfaguanidine substantially uncontaminated by sulfamethazine and of sulfamethazine from a mixture of sulfaguanidine, sulfamethazine and impurities, which mixture is obtained by the condensation of sulfaguanidine with acetylacetone to form sulfamethazine, which comprises heating said mixture with dilute aqueous ammonium hydroxide solution and thereby effecting solution of substantially all of said sulfaguanidine and sulfamethazine, cooling the resulting solution and thereby effecting precipitation of the sulfaguanidine substantially uncontaminated by sulfamethazine, separating the precipitated sulfaguanidine from the cooled mixture, acidifying the residual alkaline solution to a point at which there is no undissolved material present, treating the acidified solution with decolorizing activated carbon, and neutralizing the resulting treated solution with ammonium hydroxide while agitating and maintaining the mixture at a temperature at from 10° to 20° C. and thereby precipitating sulfamethazine.

HENRY H. RICHMOND.

REFERENCES CITED

The following references are of record in the file of this patent:

UNITED STATES PATENTS

| Number | Name | Date |
|---|---|---|
| 2,309,739 | Roblin et al. | Feb. 2, 1943 |
| 2,392,125 | Dhein | Jan. 1, 1946 |
| 2,407,966 | Sprague | Sept. 17, 1946 |
| 2,417,939 | Kuh et al. | Mar. 25, 1947 |
| 2,420,703 | Ellingson | May 20, 1947 |